(12) United States Patent
Takahashi et al.

(10) Patent No.: US 7,148,664 B2
(45) Date of Patent: Dec. 12, 2006

(54) HIGH FREQUENCY PARTIAL BOOST POWER FACTOR CORRECTION CONTROL CIRCUIT AND METHOD

(75) Inventors: Toshio Takahashi, Rancho Palos Verdes, CA (US); Yong Li, Torrance, CA (US)

(73) Assignee: International Rectifier Corporation, El Segundo, CA (US)

( * ) Notice: Subject to any disclaimer, the term of this patent is extended or adjusted under 35 U.S.C. 154(b) by 0 days.

(21) Appl. No.: 11/269,377

(22) Filed: Nov. 7, 2005

(65) Prior Publication Data

US 2006/0119337 A1 Jun. 8, 2006

Related U.S. Application Data

(63) Continuation-in-part of application No. 11/165,939, filed on Jun. 24, 2005.

(60) Provisional application No. 60/626,113, filed on Nov. 8, 2004, provisional application No. 60/626,112, filed on Nov. 8, 2004, provisional application No. 60/583,752, filed on Jun. 28, 2004.

(51) Int. Cl.
*G05F 1/56* (2006.01)

(52) U.S. Cl. .................. 323/222; 323/285; 323/301

(58) Field of Classification Search ................ 323/207, 323/222, 283, 285, 290, 301, 351, 284
See application file for complete search history.

(56) References Cited

U.S. PATENT DOCUMENTS

| 5,349,284 | A | * | 9/1994 | Whittle .................... 323/207 |
| 5,359,276 | A | * | 10/1994 | Mammano ................ 323/207 |
| 6,580,253 | B1 | * | 6/2003 | Kanakubo et al. ......... 323/222 |
| 6,657,417 | B1 | * | 12/2003 | Hwang .................... 323/222 |
| 6,781,352 | B1 | * | 8/2004 | Athari et al. ............. 323/222 |

* cited by examiner

*Primary Examiner*—Jessica Han
(74) *Attorney, Agent, or Firm*—Ostrolenk, Faber, Gerb & Soffen, LLP

(57) ABSTRACT

A circuit for providing power factor correction includes a boost converter circuit with a boost inductance and a power factor correction switch and a control circuit. The control circuit provides a pulse width modulated signal to control the on time of a PFC switch, and also includes a power factor correction pulse width modulated device receiving as inputs a rectified AC input voltage, a DC bus voltage, a signal proportional to the current through the inductor and a reference current signal. The power factor correction pulse width modulated device also includes a pulse width modulated generator operable to provide the pulse width modulated signal to control the on time of the PFC circuit and a pulse width modulated blanking device operable to provide an enable/disable signal to disable the pulse width modulated generator when predetermined conditions are met.

13 Claims, 10 Drawing Sheets

HIGH FREQUENCY PARTIAL BOOST POWER FACTOR CORRECTION CONTROL CIRCUIT AND METHOD

CROSS-REFERENCE TO RELATED APPLICATIONS

This application is a continuation in part of application Ser. No. 11/165,939 filed Jun. 24, 2005, entitled HIGH FREQUENCY PARTIAL BOOST POWER FACTOR CORRECTION CONTROL CIRCUIT AND METHOD which claims the benefit and priority of Provisional Application Ser. No. 60/583,752 filed Jun. 28, 2004, entitled A NEW HIGH-FREQUENCY PARTIAL BOOST POWER-FACTOR-CORRECTION CONTROL METHOD, the entire disclosure of which is hereby incorporated by reference herein. This application also claims benefit of and priority to Provisional Application Ser. No. 60/626,113 filed Nov. 8, 2004 entitled PWM BLANKING ALGORITHM IN HIGH FREQUENCY PARTIAL PFC and Provisional Application Ser. No. 60/626,112 filed Nov. 8, 2004 entitled DC BUS VOLTAGE CONTROL METHOD IN HIGH-FREQUENCY PARTIAL PFC, the entire disclosures of which are hereby incorporated by reference herein.

BACKGROUND OF THE INVENTION

The present invention relates to power factor correction circuits, that is, circuits for reducing the distortion and harmonics generated in a power line feeding a power supply, and in particular a switched mode power supply. Power factor correction (PFC) circuits are utilized to reduce harmonics on power lines and in particular, make the circuit, including the attached load, appear to be a substantially purely resistive load. The aim of power factor correction circuits is to ensure that the AC voltage and current are substantially in phase. This improves efficiency and at the same time eliminates the generation of harmful harmonics.

In the past, passive solutions as shown in FIG. 1 have been employed. An inductor is provided at the output of the rectifier. Because the inductor operates at the line frequency, the physical size and inductance size are normally very large, requiring high costs and increasing size of the circuit. The input current waveform is smoothed, but typically does not meet today's regulation requirements.

FIG. 2 shows another prior art approach that provides an active solution wherein a controllable switch S is added together with a series inductor ahead of the rectifier. This switch is turned on for a short time period every half cycle of the line frequency, for example, 120 Hz or 100 Hz. Manufacturers use this method to smooth the input current which may satisfy some applicable regulation standards, in particular in Japan, but may not meet the strict IEC standard for the European markets. Also the inductor operates at the line frequency and its physical size and inductance are still large, resulting in still high costs and circuit size.

A third approach is another active solution which uses high frequency full boost power factor correction. This is the most popular PFC control method and is shown in FIG. 3 providing DC voltage to a motor drive inverter INV driving a motor ML. A switch, for example an IGBT $Q_1$, is switched at high switching frequency normally in the 50 KHz to 100 KHz range. It can achieve nearly 100% power factor which actually exceeds most regulation standards. Because of the high frequency PWM, it requires a small physical size inductor and a small size inductance. However, even this circuit has drawbacks. In particular, the high frequency PWM switching causes high switching losses, less efficiency and creates electromagnetic interference (EMI) noise and 100% PFC may be more than is necessary for many design applications.

An aim of the present invention is to meet applicable regulation standards but not necessarily exceed such standards thereby to trade off power factor for reduced losses and increased efficiency by reducing switching losses and noise generation. FIG. 4 shows waveforms of the conventional active high frequency full boost PFC circuit shown in FIG. 3.

Another aim of the present invention is to provide a circuit and method of blanking or disabling a pulse width modulation signal used in a power factor correction circuit, thereby reducing switching losses while otherwise providing for an efficient circuit.

An additional aim of the present invention is to provide a circuit and method for controlling DC bus voltage in a power factor correction circuit to provide a preferred current waveform.

SUMMARY OF THE INVENTION

The invention provides an alternative PFC circuit and method. Depending on the regulation requirements, tradeoffs can be made between PFC performance (power factor and harmonic generation) and switching losses and efficiency. This method uses a similar circuit topology as the conventional high frequency boost PFC circuit shown in FIG. 3, but with a different control concept.

According to the invention, a partial boost PFC is employed which instantaneously compares the AC input voltage with the DC bus voltage and, on top of the active boost PFC control loop, enables and disables the PFC PWM switching for a certain period of each line cycle. When the input voltage is less than the DC bus voltage, the generation of PWM switching signals is enabled and the switch is switched at high frequency, for example at 50 KHz. Due to the high bandwidth current loop, the input current is built up in the shape of a sinusoidal reference which is generated by the voltage loop. When the input voltage is greater than the DC bus voltage, the generation of PWM switching signals is disabled. Relying on the difference between the input voltage and the DC bus voltage, both the rectifier and PFC diode will still conduct, and input current continuously flows. In this partial PFC operation, the closed loop current control is maintained during the period when the PWM switching is enabled and globally closed voltage loop control is maintained.

In accordance with another embodiment of the present invention, a partial boost PFC circuit is employed with a power fact correction pulse width modulated device that includes a pulse width modulated generator to provide a pulse width modulated signal and a pulse width modulated blanking device that provides an enable/disable signal to disable the pulse width modulated generator when certain conditions are met.

BRIEF DESCRIPTION OF THE DRAWING(S)

The invention will be now be described in greater detail in the following detailed description with reference to the drawings in which FIG. 1 shows a prior art passive PFC circuit;

Other objects, features and advantages of the present invention will be apparent from the following detailed description.

DETAILED DESCRIPTION OF PREFERRED EMBODIMENTS OF THE INVENTION

Figure 5:
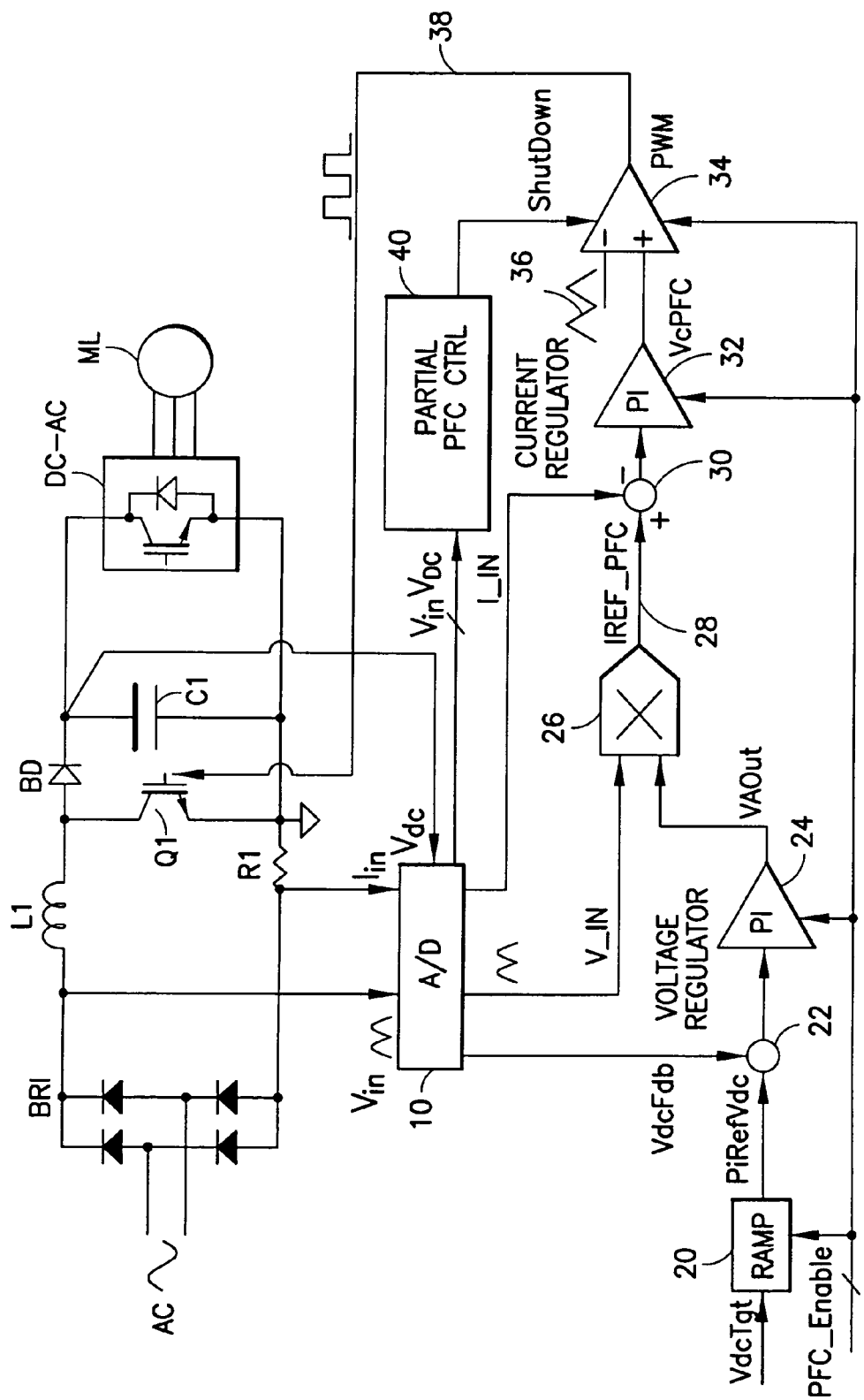
FIG. 5 shows the high frequency partial PFC circuit according to the present invention.

With reference again to the drawings, FIG. 5 shows the PFC circuit according to the present invention. The circuit includes a bridge rectifier BR1 fed from the AC supply. The rectified AC is provided to the boost inductor L1. A PFC switch Q1 is coupled in series with the inductor and across the output of the bridge rectifier after the inductor. The boost diode BD is coupled in series with the inductor L1 and the output capacitor C1 is coupled as shown at the output of the boost converter circuit in known fashion. The voltage across the capacitor C1 comprises the DC bus voltage which is provided to a load which might comprise, for example a DC to AC inverter driving a three phase motor load ML, for example.

The output of the DC bus $V_{DC}$ is provided to an A to D converter 10 which has as inputs the DC bus voltage $V_{DC}$, the current $I_{IN}$ in the inductor L1 as sensed by a resistor R1 or by other sensing means, as well as the rectified AC input voltage $V_{IN}$. The A to D converter produces three outputs comprising digital representations of the DC bus voltage, VdcFdb, the input voltage $V_{IN}$ and the inductor current $I_{IN}$. Although a digital implementation is shown for the circuit, the circuit can also be implemented with analog components. $V_{IN}$ and $V_{DC}$ are also provided to a circuit 40, to be described below.

The circuit comprises a ramp generator 20 which receives a DC target voltage VdcTgt. The output of the ramp generator RefVdc is provided to a difference circuit 22 in which the DC bus voltage is subtracted from the ramp voltage. This is fed to a voltage regulator which may comprise a PI controller 24. The output of the PI controller 24 is fed to a multiplier circuit 26 wherein the voltage output from the voltage regulator (PI controller) and the input voltage $V_{IN}$ are multiplied. This results in a reference PFC signal IREF_PFC 28, from which the inductor current is subtracted in a difference stage 30. The output of this difference stage 30 is fed to a current regulator 32 comprising a PI controller. The output of the controller 32 is fed to a comparator 34 wherein the PWM signal is generated by comparing an oscillator signal, typically a ramp or sawtooth signal 36 generated by an oscillator, with the output of the controller 32. This controls the duty cycle of the PWM signal provided to control the switch Q1 and thereby control the power factor correction.

A PFC enable signal is provided to blocks 20, 24, 32 and 34 to disable PFC operation from another circuit.

Figure 3:
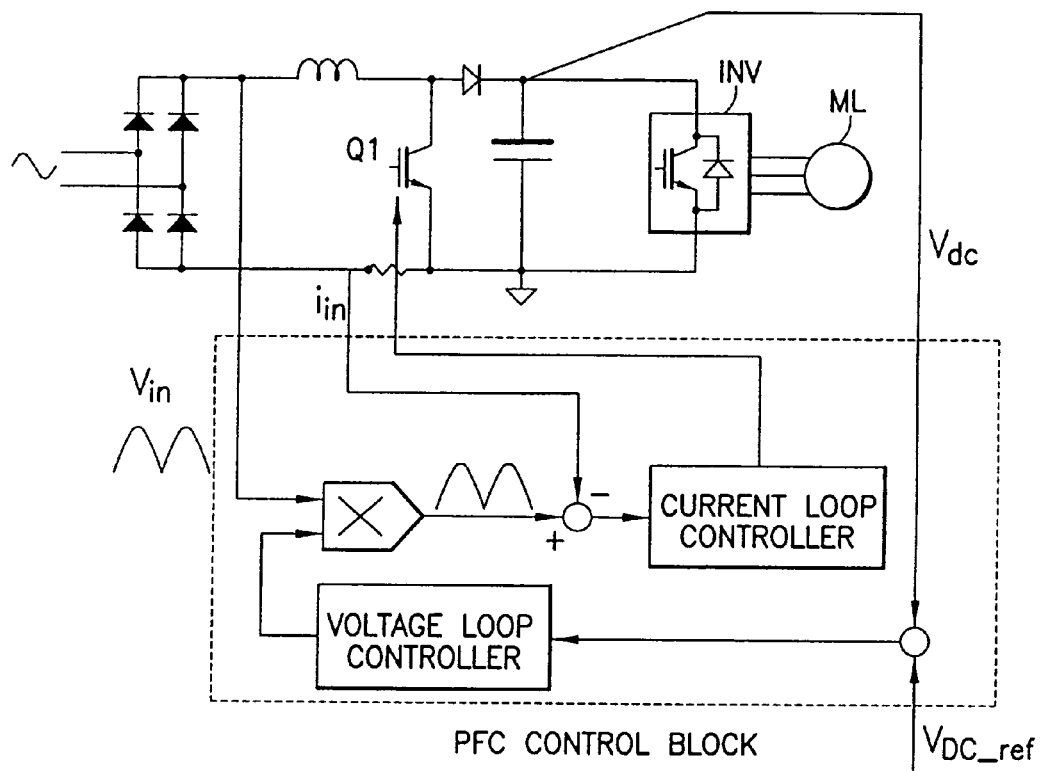
FIG. 3 shows yet another active PFC circuit.

The described control circuit is substantially the conventional circuit as shown in FIG. 3. The voltage regulation loop of FIG. 3 comprises the components 20 and 24 wherein the DC bus voltage and the target voltage are compared to provide the voltage regulation control signal fed to the multiplier 26. The current loop includes the components 32 and the PWM comparator 34 whose output is coupled to control the switch Q1.

According to the invention, a partial PFC controller 40 is provided which is fed the control signals $V_{IN}$ and $V_{DC}$, preferably in digital form. It can also be implemented in analog form, within the concept of the invention. As before, Vin is the instantaneous rectified AC input voltage and $V_{DC}$ is the instantaneous DC bus voltage. Partial PFC control circuit 40 operates as follows. Circuit 40 compares the rectified AC input voltage $V_{IN}$ with the DC bus voltage $V_{DC}$. When the rectified AC input voltage is less than the DC bus voltage, partial PFC controller 40 provides a signal to the PWM comparator 34 to enable the PWM comparator, thereby providing PWM signals to control the on time of switch Q1. This is performed at a high frequency, for example 50 KHz as in the prior art. Due to the high bandwidth current loop, the input current is built up in the shape of a sinusoidal reference IREF_PFC which is generated by the voltage loop. When Vin is greater than Vdc, that is, when the rectified AC input voltage is greater than the DC input voltage, PWM switching of the switch Q1 is not necessary for many applications, and therefore the generation of PWM switching signals is disabled. Partial PFC controller 40 provides a shutdown signal to the PWM comparator 34 to disable PWM operation and accordingly switch Q1 is maintained in an off state. However, because the rectified AC input voltage is greater than the DC bus voltage, the bridge rectifier and the boost diode BD will continue to conduct and input current will flow continuously.

In this partial PFC operation, the closed loop control current is maintained during the period when the PWM switching is enabled and globally closed loop voltage loop control is maintained.

Figure 6:
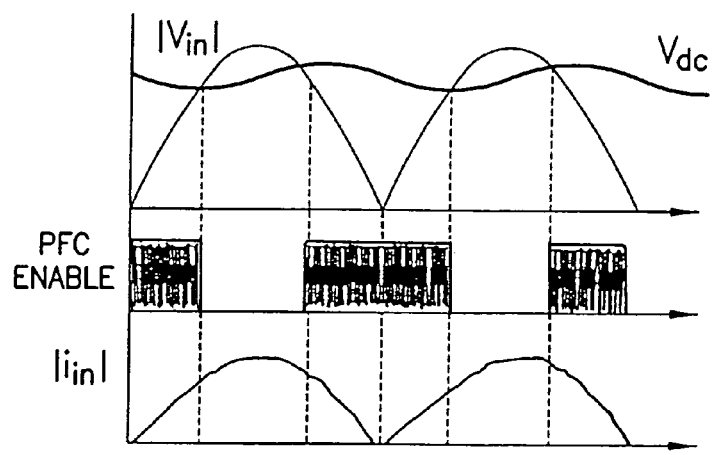
FIG. 6 shows waveforms in the circuit of FIG. 5.
Figure 4:
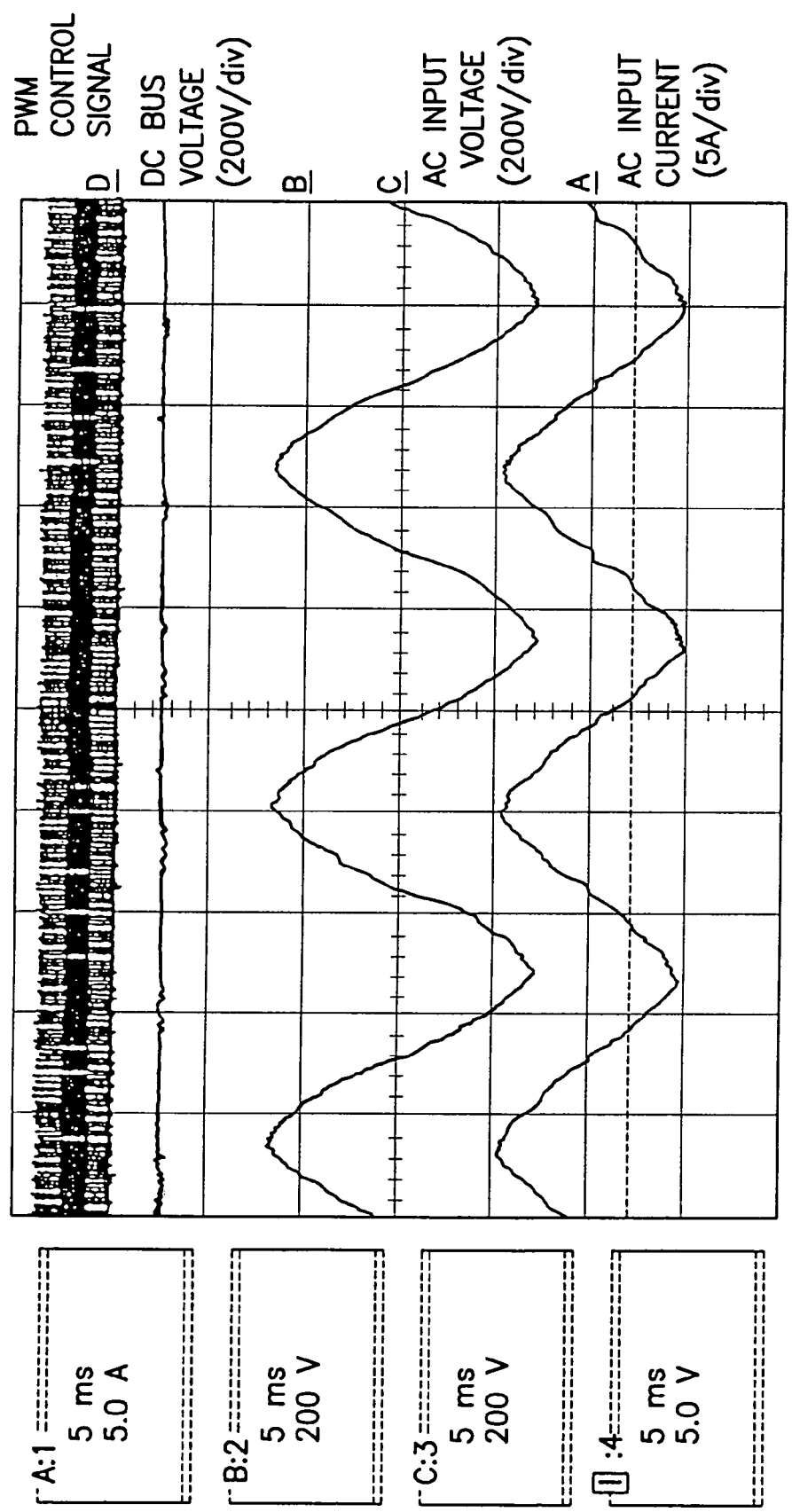
FIG. 4 shows waveforms in the circuit of FIG. 3.

FIG. 6 shows the control timing of the high frequency partial PFC circuit of FIG. 5. FIG. 6 shows the rectified AC input voltage $V_{IN}$ and the DC bus voltage $V_{DC}$. As shown, when the rectified AC input voltage is greater than the DC bus voltage, the PWM switching is disabled. The PWM switching is enabled when the rectified AC input voltage is less than the DC bus voltage. FIG. 6 also shows the inductor current IN.

Figure 7:
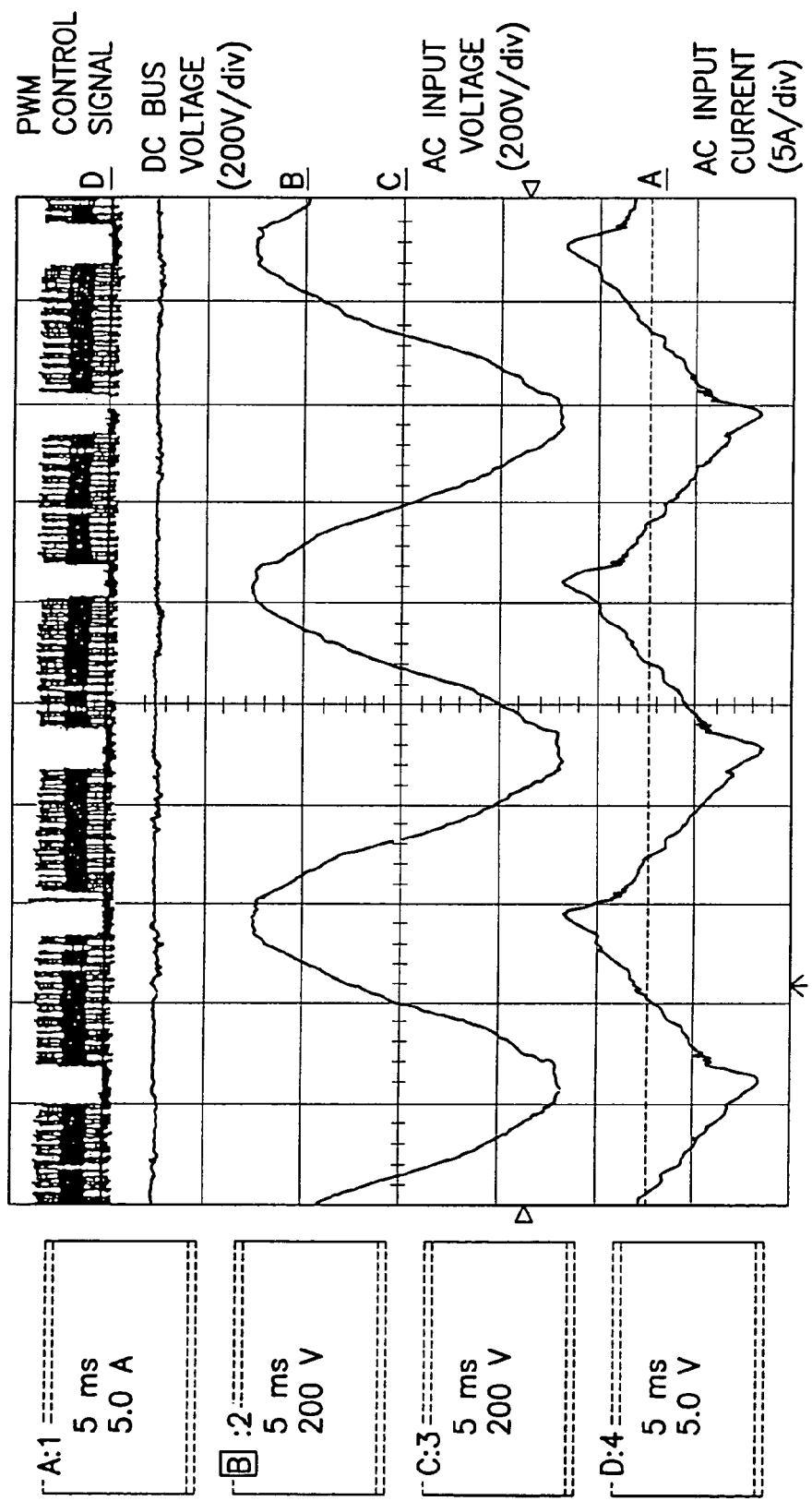
FIG. 7 shows further waveforms in the circuit of FIG. 5.

FIG. 7 shows signals in the circuit of FIG. 5 including the PWM control signal, DC bus voltage, the AC input voltage and the AC input current. As shown by the PWM control signal, when the rectified AC input voltage exceeds DC bus voltage, the PWM switching is disabled.

Table 1 compares the measured power factor THD (total harmonic distortion) and efficiency comparing a simple diode bridge rectifier circuit, the invented partial boost PFC circuit and the conventional full boost PFC circuit shown in FIG. 3. Major features of the circuit according to the invention are as follows: improved crest factor and THD in comparison with the bridge rectifier circuit.

Figure 1:
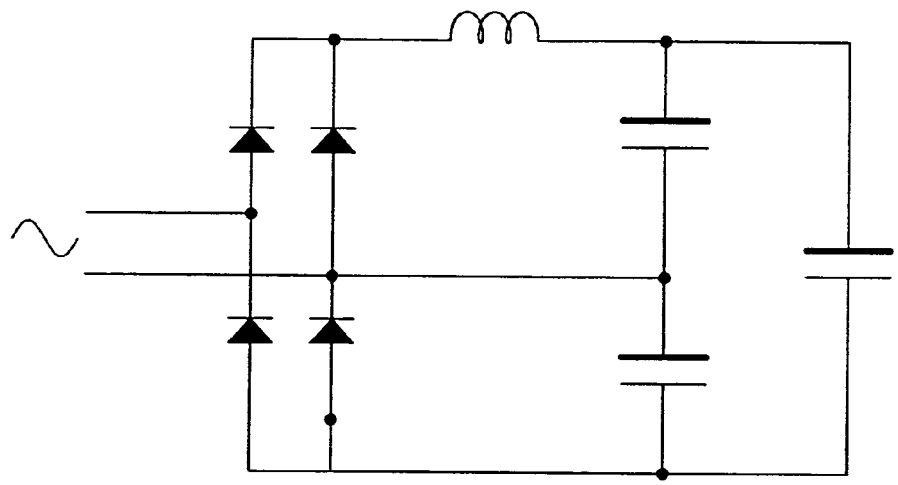
Figure 2:
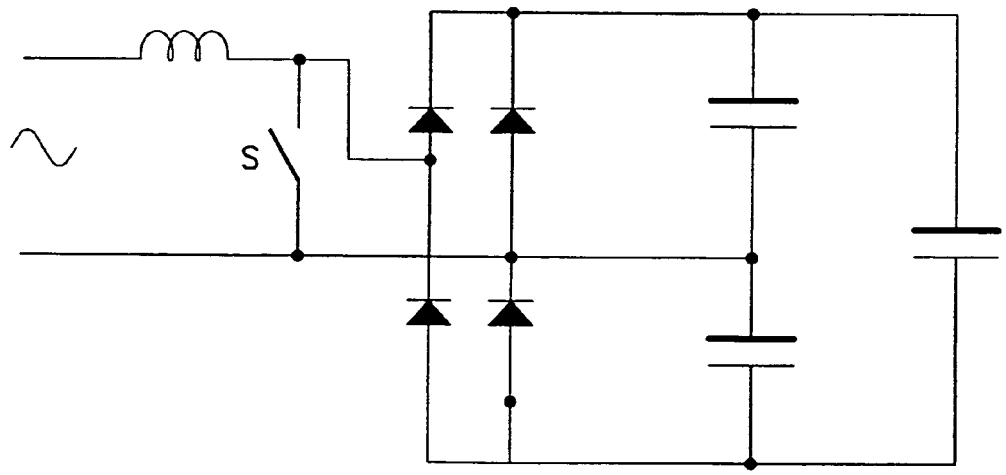
FIG. 2 shows a prior art active PFC circuit.

Because the switching frequency is high when PWM switching is enabled, the PFC inductor size and costs are much less than the existing prior art solutions of FIGS. 1 and 2 where the PFC switching frequency is only at the line frequency.

TABLE 1

Comparison of Measured Power Factor and Efficiency

|  | Diode Bridge Rectifier | Invented Partial Boost PFC | Conventional Full Boost PFC |
|---|---|---|---|
| Vdc (V) | 295.8 | 308.5 | 307.5 |
| Vin_rms (V) | 231.8 | 224.3 | 192.3 |
| Input Power Pin (W) | 528 | 584 | 591 |
| Output Power Po (W) | 521 | 567 | 563 |
| Iin_peak (A) | 7.42 | 5.15 | 4.92 |
| Iin_rms (A) | 3.21 | 2.69 | 3.10 |
| Crest Factor | 2.31 | 1.91 | 1.59 |
| THD (%) | 90.66 | 19.03 | 8.26 |
| Power Factor | 0.710 | 0.967 | 0.991 |
| Efficiency (%) | 98.7 | 97.1 | 95.3 |

Because fewer switching events occur than in the conventional boost PFC shown in FIG. 3, there is less switching loss and noise. This can improve efficiency while achieving relatively good PFC performance.

Second Embodiment

Figure 8:
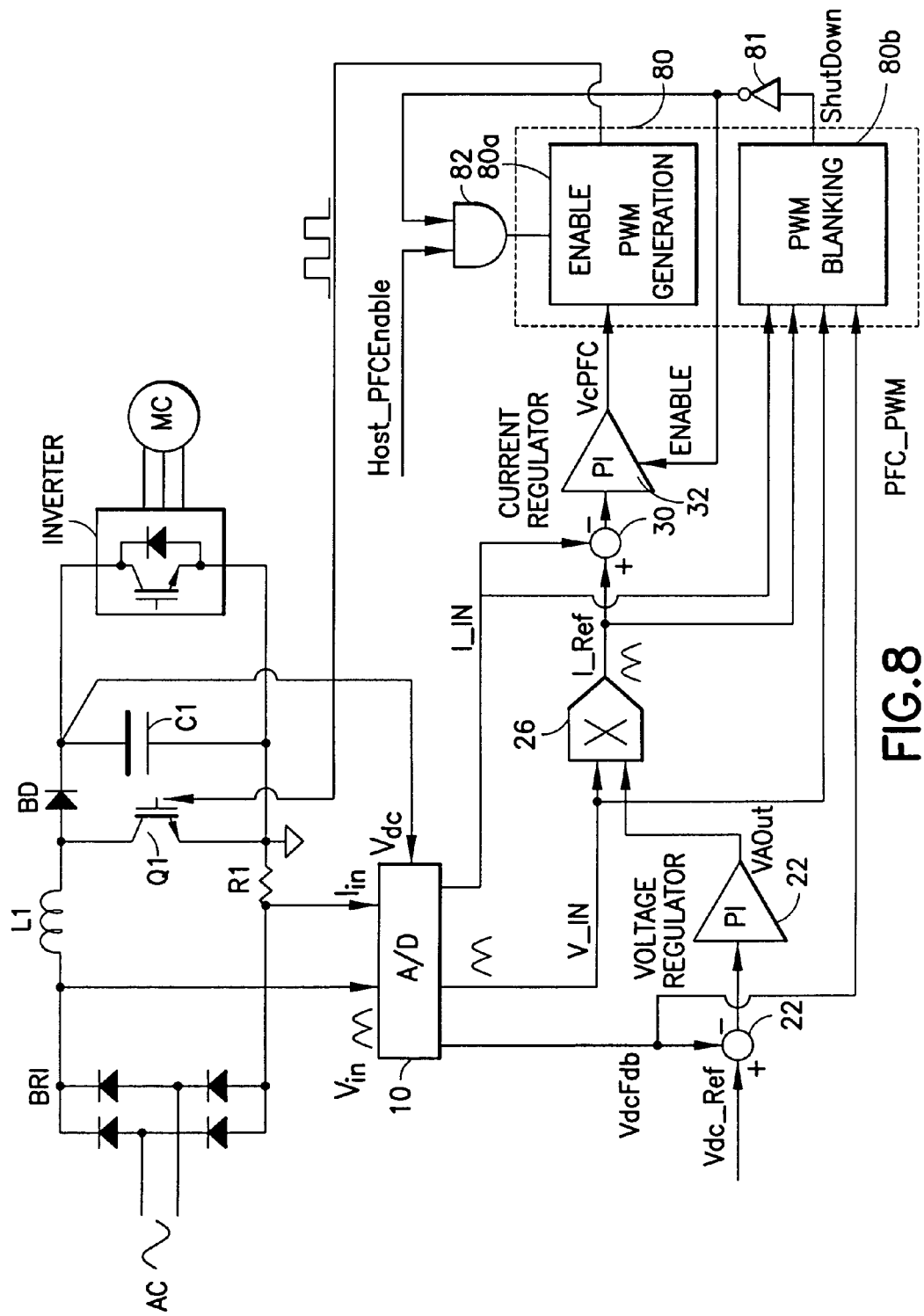
FIG. 8 shows a high frequency partial PFC circuit according to another embodiment of the present invention.

FIG. 8 illustrates a second embodiment of a high frequency partial PFC circuit according to an embodiment of the present application. The partial PFC circuit of FIG. 8 is very similar to that of FIG. 5, and operates in a similar manner. Common reference numbers and symbols are used for corresponding elements of FIG. 5 and FIG. 8. In FIG. 8, a PFC pulse width modulated device (PFC_PWM) 80 may be provided in place of partial PFC controller 40 and comparator 34. The PFC_PWM includes pulse width modulated (PWM) generator 80a that provides the pulse width modulated signal used to control switch Q1 and a pulse width modulate (PWM) blanking device 80b which provides a signal, ShutDown, to disable or blank the PWM generator 80a. The ShutDown signal may be an enable/disable signal that may be used to enable, or disable the PWM generator 80a.

The PWM Blanking device 80b takes as inputs the input current I_IN, the reference current I_Ref, the input voltage V_IN and the DC voltage VdcFdb. The inputs are all preferably in digital form, however, they may be analog as well. The output of the PMW blanking device 80b is the enable/disable signal, ShutDown. When ShutSown="0" the PMW generator 80a is enabled and a high frequency PMW signal is generated to control the switch Q1. When ShutDown=1, the PWM generator 80a is disabled and the IGBT Q1 is OFF. The difference between the AC input voltage Vin and DC bus voltage Vdc, allows both rectifier diodes and the PFC diode to conduct and the input current I_IN continuously flows. In a preferred embodiment, during the disable interval, the current regulator, PI 32 may also be disabled as illustrated.

More specifically, the ShutDown signal is output from PWM blanking device 80b and provided to inverter 81 such that when ShutDown=0 the output of inverter 81 is "1". The output of the inverter 81 is provided to AND gate 82. An enable signal, Host_PFC Enable, may also be provided to the AND gate 82 such that the PWM generator 80a is not enabled unless enablement is indicated by both the ShutDown signal and the Host-PFC Enable signal, which is preferably provided from another circuit element.

Naturally, the generation of the ShutDown signal is important to proper usage of the partial PFC of the present invention. Some of the challenges in providing this signal include (1) the requirement for cycle-to-cycle real time control, in which no delay can be allowed (2) the requirement that the generation of the ShutDown signal be immune to noise, including sudden changes in AC line voltage, measurement noise and variations in voltage and current, di/dt and dv/dt and (3) the requirement that the transition between enablement and disablement of the PWM generator 80a be smooth and upon return to the enablement mode from disablement, the current regulator should quickly force the PFC inductor L1 current to track the sinusoidal reference I_Ref.

With these challenges in mind, it is useful to provide a specific method or algorithm for generating the Shutdown signal. The algorithm is implemented in the PWM blanking device and is represented in psuedocode as follows:

```
if(V_IN>= VdcFbd_High) then
        ShutDown<=1        //Absolute protection to prevent
                           unwanted over current fault when there
                           is a sudden jump on AC line voltage
        else if(V_IN>=VdcFdb_Low) AND (Shutdown has been "ø"
for a minimum time) then
        ShutDown <= 1;
        Else if (ShutDown has been "1" for a minimum time) AND
                (I_IN is decreasing) AND
                (I_IN is equal or less than I_Ref)
        the ShutDOWN <=0
        end if
    End if
end if
Assign VdcFdb_High <= VdcFbd − Delta 1
    Assign VdcFdb_Low<= VdcFbd − Delta 2, where Delta 1>Delta 2
        and are adjustable by a HOST or user.
```

That is, two parameters, VdcFdb_High, and VdcFdb_Low, are set such that VdcFdb_High is less than or equal to VdcFab_$_{Delta}$ 1 and VdcFdb_Low is less than or equal to VdcFdb_$_{Delta}$ 2. As noted above, Delta 1 is greater than Delta 2 and both Delta 1 and Delta 2 are preferably provided by a HOST or other means outside of the circuit.

In accordance with the method of the present embodiment, if V_IN is greater than or equal to VdcFdb_High, then Shutdown will be 1 and the PWM generator 80a is disabled.

Otherwise, if V_IN is greater than or equal to VdcFdb_Low and Shutdown has been "0" for a first predetermined minimum period of time, then, the value of ShutDown is 1 and the PWM generator 80a is similarly disabled.

If Shutdown had been "1" for a second predetermined minimum period of time, that is the PWM generator 80a has been enabled, I_IN is decreasing and I_IN is less than or equal to I_Ref, then the value of Shut Down is 0 and the the PWM generator 80a is enabled.

As a result, implementing this method, the enable/disable signal, ShutDown is generated in a matter consistent with the requirements discussed above.

Third Embodiment

In another embodiment of the present application, it may be desireable to control the DC Bus voltage of the partial PFC circuit. In the partial PFC circuit of the present application, it is no longer necessary for the DC bus voltage to be set higher than the peak AC input voltage, rather the DC bus voltage should be set around the peak of the AC input voltage. In order to maintain continuous inductor current while the PWM signal is disabled, however, the instant DC voltage is preferably slightly lower than the instant AC voltage. How close the DC voltage is to the AC peak voltage will affect the current waveform quality as well as the power factor and the harmonic content of the circuit.

In the present embodiment, an objective is to provide a method and circuit to control the DC bus voltage, however, the objective is not necessarily to maintain a fixed DC voltage that is higher than the maximum peak AC voltage, but rather to regulate the DC bus voltage in order to generate desirable current waveforms in the partial PFC circuit.

Figure 9:
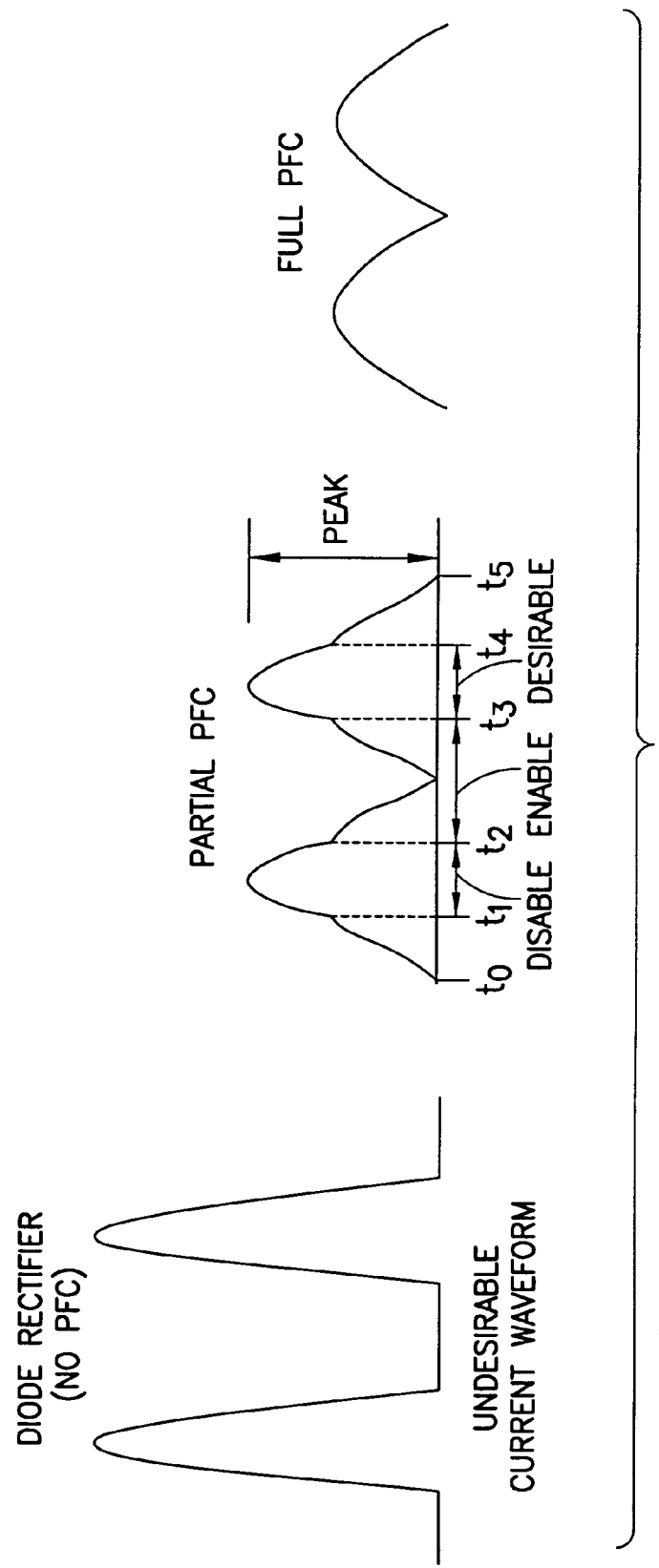
FIG. 9 illustrates exemplary current waveforms for the various circuits.

FIG. 9 illustrates three current waveforms for three different circuits: diode rectifier(no PFC used), partial PFC and full PFC. As illustrated, the partial PFC current waveform includes "bumps" in the middle, which is typically where PWM is disabled either via the Partial PFC control device 40 of the first embodiment or by the PWM blanking device 80b of the second embodiment. The amplitude and the duration of the bumps is the result of many factors including the difference between AC voltage and DC bus voltage, inductor size, line impedance, power of the load, etc. However, it is desirable to identify a single variable to characterized waveform quality. Thus, a variable "Waveform Quality Ratio" or simply "Ratio" is defined as the line cycle average current value over the line cycle peak current value, that is:

Ratio=Average/Peak

The higher the ratio is, the better the wave form quality. The full PRC circuit provides the highest ratio and the diode rectifier, without PFC, has the lowest ratio. For partial PFC circuits, the ratio varies depending on DC bus regulation.

Figure 10:
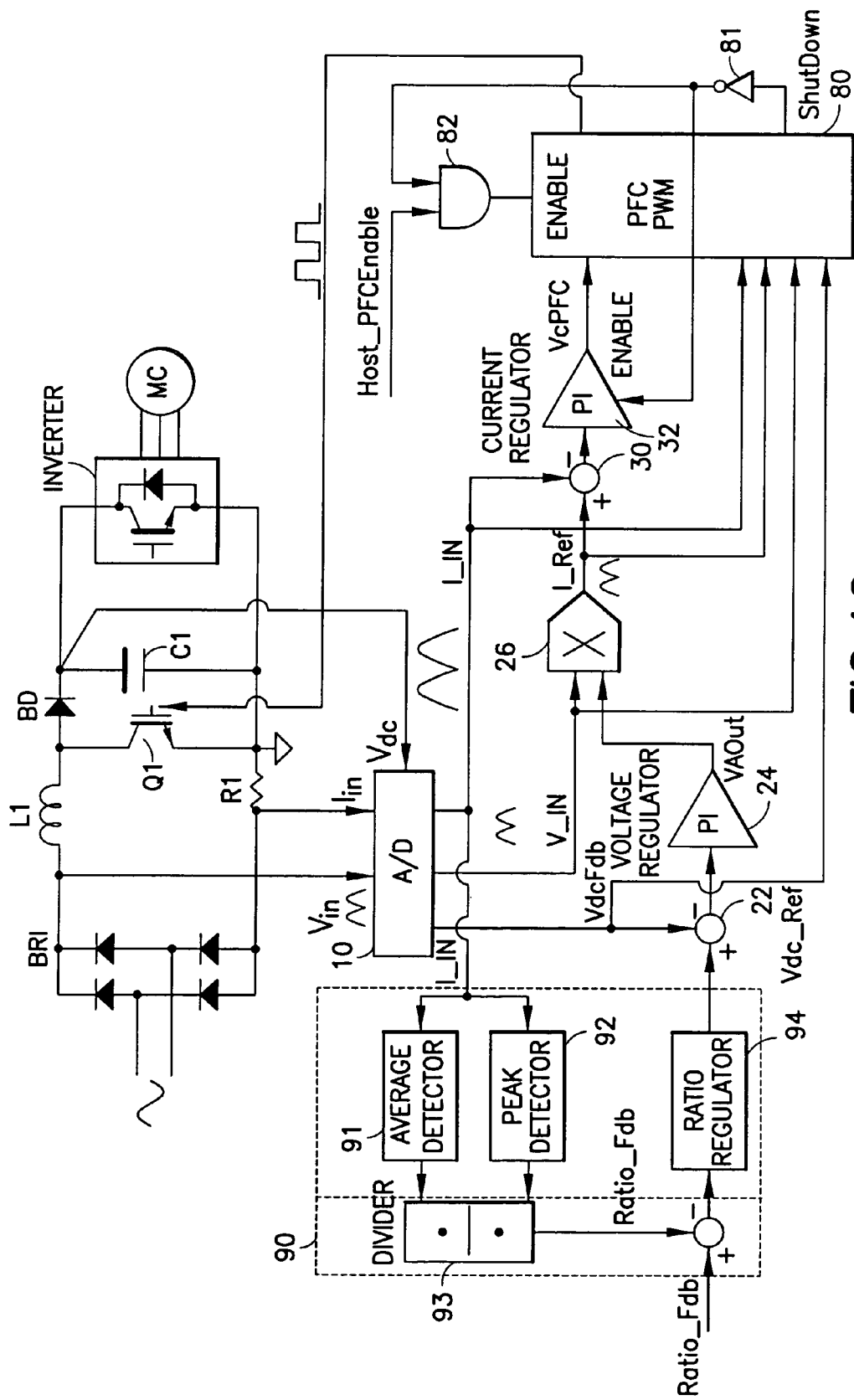
FIG. 10 shows a high frequency partial PFC circuit according to another embodiment of the present invention.

A circuit for power factor correction in accordance with the present embodiment of the present invention is illustrated in FIG. 10. FIG. 10 is substantially similar to FIG. 8 and operates in a similar manner. Common reference numbers and symbols are provided for common elements of FIG. 8 and FIG. 10. In FIG. 10, the input current I_in is input into the DC bus voltage regulating device 90. Average detector 91 is provided to determine the line-cycle average current. The peak detector 92 is provided to determine the line-cycle peak current. A divider device 93 divides the line-cycle average current by the line-cycle peak current to provide a ratio signal Ratio-Fdb. The ratio signal Ratio-Fdb is subtracted from a ratio reference signal Ratio_Ref. The result is provided to ratio regulator 94 which adjusts the reference voltage Vdc_ref used by the subtraction device 22 to provide the signal provided to the voltage regulator.

More particularly, the ratio regulator 94 increases the reference signal Vdc_ref when the ratio signal Ratio_Fdb is less that the reference ratio Ratio_Ref. The increased reference voltage Vdc_ref increases the output of the voltage regulator VAOut and leads to an increase in the signal I_Ref of the multiplier 26. As a result the DC bus voltage Vdc will tend to increase to the level as Vdc_ref commands. Due to the power balance of the circuit, however, the RMS value of the inductor current remains unchanged which results in a decrease of inductor current during the period when the PWM signal is disabled resulting in a decrease in the "bump" peak discussed above. Thus, the ratio increases to result in a better current waveform.

Figure 11:
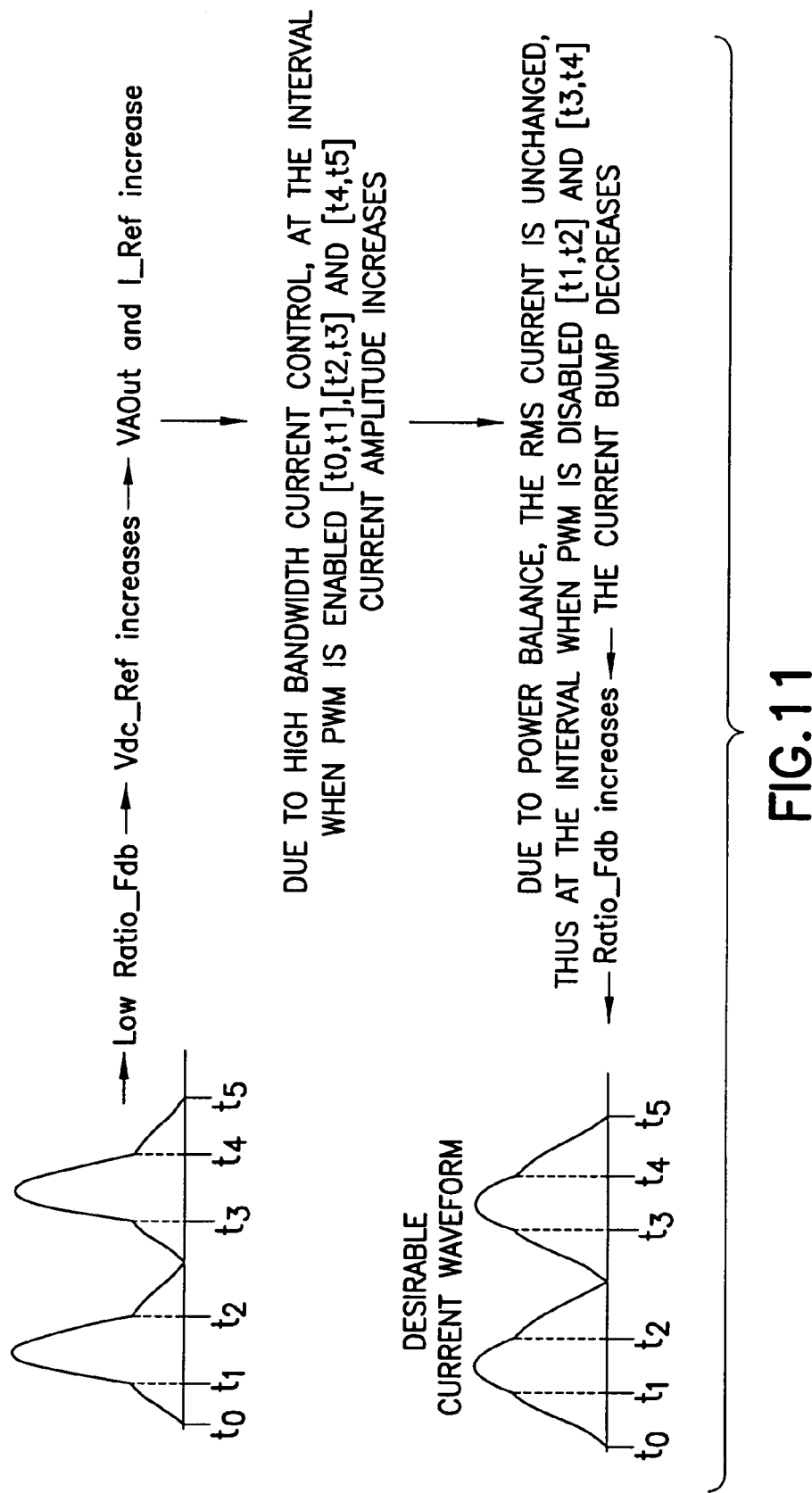
FIG. 11 illustrates the improved current waveform provided by the circuit of FIG. 10.
Figure 12:
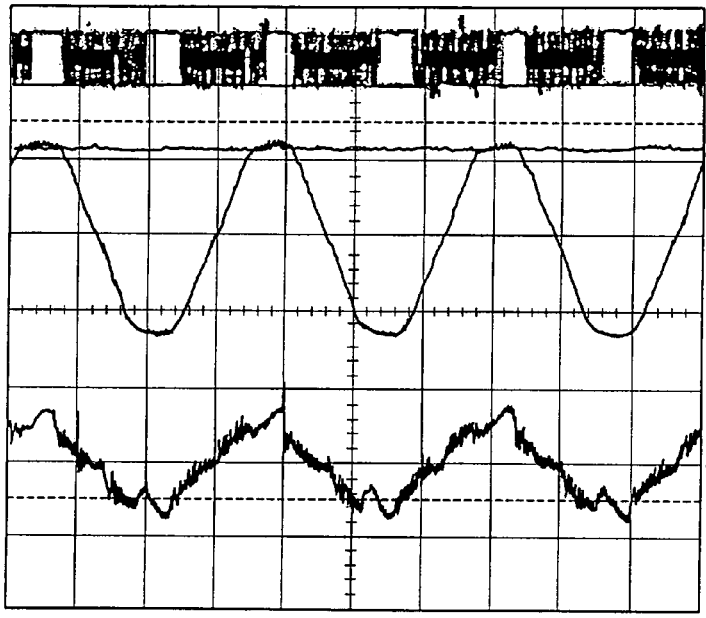
FIG. 12 illustrates waveforms of a circuit utilizing partial boost PFC and implementing the features of FIGS. 8 and 10.
Figure 12:
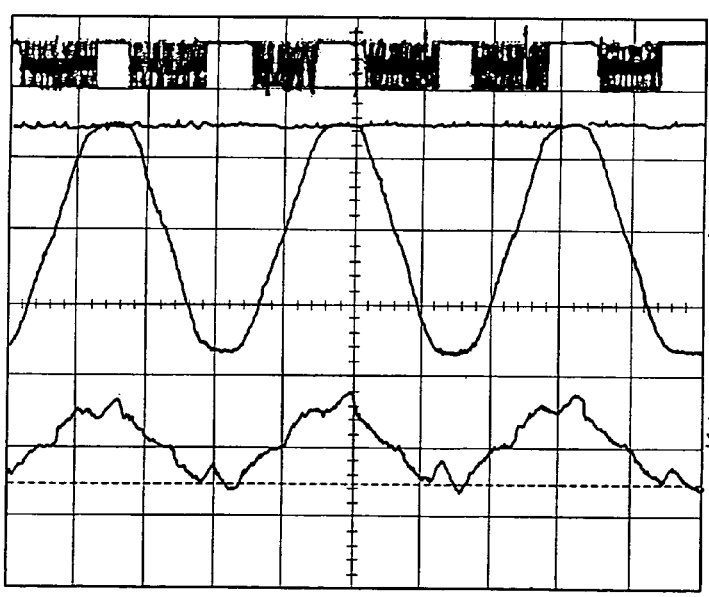

FIG. 11 illustrates how the method of controlling the DC bus voltage improves the current waveform. In the first segment, the waveform illustrates a low ratio and thus an undesirable current waveform. As a result, DC bus voltage regulating device 90 provides for an increased reference voltage Vdc_ref as described above. Thus, the VAOut and I_Ref signals are increased. Due to the high bandwidth current control, at the interval(s) when PWM is enabled ([t0,t1], [t2,t3] and [t4,t5]) the current amplitude increases. However, due to the power balance of the circuit, the RMS current remains unchanged and thus at the interval when the PWM signal is enabled ([t1,t2] and[t3,t4]) the current "bump" decreases. Thus, the ratio represented by Ratio_Fdb increases resulting in a desirable current waveform as illustrated. FIG. 12 illustrates the partial PFC as proposed in the present application and also illustrates the smooth transition of inductor current between PWM enable mode and disable mode provided by method of embodiment 2 and that the DC bus voltage is controlled to be around the peak of AC line voltage to provide a desirable current waveform as discussed in embodiment 3 of the present application. Thus, FIG. 11 illustrates the beneficial effects provided by all three embodiment of the present application.

Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. A circuit for providing power factor correction including
    a boost converter circuit having a boost inductance and a power factor correction switch coupled in series with the boost inductance, the boost inductance and power factor correction switch being coupled across the output of a rectifier being supplied with AC power from an AC line, the boost converter circuit further comprising a boost diode coupled to a junction between the inductor and the switch, an output of the boost diode coupled to an output capacitor, a DC bus voltage being provided across the output capacitor,
    further comprising a control circuit receiving as inputs a rectified AC input voltage from the rectifier, a signal proportional to current through the inductor and the DC bus voltage across the capacitor, and wherein the control circuit provides a pulse width modulated signal to control the on time of the PFC switch, the control circuit further comprising:
    a power factor correction pulse width modulated device receiving as inputs the rectified AC input voltage, the DC bus voltage, the signal proportional to the current through the inductor and a reference current signal, wherein the power factor correction pulse width modulated device further comprises:
    a pulse width modulated generator operable to provide the pulse width modulated signal to control the on time of the PFC circuit; and
    a pulse width modulated blanking device operable to provide an enable/disable signal to disable the pulse width modulated generator when predetermined conditions are met, wherein the pulse width modulated blanking device provides the enable/disable signal to disable the pulse width modulated generator when a first result set at a value less than or equal to the DC bus voltage minus a first predetermined value is less than or equal to the rectified AC input voltage.

2. The circuit of claim 1, wherein the pulse width modulated blanking device provides the enable/disable signal to disable the pulse width modulated generator when a second result set at a value less than or equal to the DC bus voltage minus a second predetermined value is less than the rectified AC voltage and when the enable/disable signal has been enabling the pulse width modulated generator for a first predetermined period of time.

3. The circuit of claim 2, wherein the pulse width modulated blanking device provides the enable/disable signal to enable the pulse width modulated generator when the enable/disable signal has disabled the pulse width modulated generator for a second predetermined period of time, the signal proportional to the current through the inductor is decreasing and the signal proportional to the current through the inductor is less than the reference current.

4. The circuit of claim 1, further comprising a decision gate provided with the enable/disable signal and a host disable signal, provided from another circuit, wherein the pulse width modulated generator is disabled only when both the enable/disable signal is provided to disable the pulse width modulated generator and the host disable signal is provided to disable the pulse width modulated generator.

5. A method for providing power factor correction in a boost converter circuit, wherein the boost converter circuit has a boost inductance and a power factor correction switch coupled in series with the boost inductance, the boost inductance and power factor correction switch being coupled across the output of a rectifier supplied with AC power from an AC line, the boost converter circuit further comprising a boost diode coupled to a junction between the inductor and the switch, an output of the boost diode coupled to an output capacitor, a DC bus voltage being provided across the output capacitor, further comprising a control circuit receiving as inputs a rectified AC input voltage from the rectifier, a signal proportional to current through the inductor and the DC bus voltage across the capacitor, and wherein the control circuit provides a pulse width modulated signal to control the on time of the PFC switch,
the method comprising disabling the pulse width modulated signal when certain conditions are met, wherein the disabling step further comprises the steps of:
subtracting a first reference value from the DC bus voltage and setting a first result less than or equal to a difference between the DC bus voltage and the first reference value;
comparing the first result to the rectified AC voltage; and
providing an enable/disable signal to disable the pulse width modulated signal when the rectified voltage is greater than or equal to the first result.

6. The method of claim 5, wherein the disabling step further comprises the steps of:
subtracting a second reference value from the DC bus voltage and setting a second result less than or equal to the second result;
comparing the second result to the rectified AC voltage and
providing the enable/disable signal to disable the pulse width modulated signal when the rectified AC voltage is greater than or equal to the second result and when the pulse width modulated signal has been enabled for a first predetermined period of time.

7. The method of claim 5, wherein the disabling step further comprises
determining whether the enable/disable signal has been provided to disable the pulse width modulated signal for a second predetermined period of time;
determining whether the signal proportional to current through the inductor is decreasing;
determining whether the signal proportional to current through the inductor is less than or equal to a reference current signal wherein
the enable/disable signal is provided to enable the pulse width modulated signal when the enable/disable signal has been provided to disable the pulse width modulated signal for the second predetermined period of time, the signal proportional to current through the inductor is decreasing and the signal proportional to current through the inductor is less than or equal to the reference current signal.

8. A circuit for providing power factor correction including
a boost converter circuit having a boost inductance and a power factor correction switch coupled in series with the boost inductance, the boost inductance and power factor correction switch being coupled across the output of a rectifier being supplied with AC power from an AC line, the boost converter circuit further comprising a boost diode coupled to a junction between the inductor and the switch, an output of the boost diode coupled to an output capacitor, a DC bus voltage being provided across the output capacitor,
further comprising a control circuit receiving as inputs a rectified AC input voltage from the rectifier, a signal proportional to current through the inductor and the DC bus voltage across the capacitor, and wherein the control circuit provides a pulse width modulated signal to control the on time of the PFC switch; wherein the control circuit further comprises
a DC bus voltage control device operable to control the DC bus voltage, wherein the DC bus voltage control device takes as an input the signal proportional to current through the inductor, the DC bus voltage control device further comprising;
an average determining device operable to determine an average of the line cycle current of the current through the inductor;
a peak determining device operable to determining a peak of the line cycle current of the current through the inductor;
a ratio determining device, operable to provide a signal indicative of a ratio between the average and the peak of the line cycle current of the current through the inductor;
a subtracting device operable to subtract the signal indicative of the ratio from a signal indicative of a reference ratio; and
a ratio regulator operable to increase a reference voltage to be used in the control circuit to increase the DC bus voltage when the ratio of the average to the peak of the line cycle current is less than the reference ratio.

9. The circuit of claim 8, wherein the increased reference voltage is provided to a voltage regulator of the control circuit and increases an amplitude provided by the voltage regulator which is multiplied by the rectified AC voltage to provide a reference signal from which the a signal proportional to current through the inductor is subtracted, the result of which is provided to a current regulator to provide an output used to control the pulse width modulated signal.

10. The circuit of claim 8, wherein the reference ratio is provided in order to improve a current waveform of the circuit.

11. A method for providing power factor correction in a boost converter circuit, wherein the boost converter circuit has a boost inductance and a power factor correction switch coupled in series with the boost inductance, the boost inductance and power factor correction switch being coupled across the output of a rectifier supplied with AC power from an AC line, the boost converter circuit further comprising a boost diode coupled to a junction between the inductor and the switch, an output of the boost diode coupled to an output capacitor, a DC bus voltage being provided across the output capacitor, further comprising a control circuit receiving as inputs a rectified AC input voltage from the rectifier, a signal proportional to current through the inductor and the DC bus voltage across the capacitor, and wherein the control circuit provides a pulse width modulated signal to control the on time of the PFC switch, the method comprising;

determining an average of the line cycle current of the current through the inductor;

determining a peak of the line cycle current of the current through the inductor;

computing a ratio between the average and the peak of the line cycle current of the current through the inductor;

subtracting the ratio between the average and the peak of the line cycle current of the current through the inductor from a reference ratio; and increasing, based on the result of the subtracting, a reference voltage used by the control circuit in regulating the DC bus voltage when the ratio between the average and the peak of the line cycle current of the current through the inductor is less than the reference ratio.

12. The method of claim 11, wherein the increased reference voltage is provided to a voltage regulator of the control circuit and increases an amplitude provided by the voltage regulator which is multiplied by the rectified AC voltage to provide a reference signal from which the a signal proportional to current through the inductor is subtracted, the result of which is provided to a current regulator to provide an output used to control the pulse width modulated signal.

13. The method of claim 11, wherein the reference ratio is provided to result in an improved current wave form of the circuit.

* * * * *